United States Patent [19]
Buuck et al.

[11] Patent Number: 5,583,449
[45] Date of Patent: Dec. 10, 1996

[54] CANCELLATION OF LINE REFLECTIONS IN A CLOCK DISTRIBUTION NETWORK

[75] Inventors: David C. Buuck, Santa Clara; Michael J. Dhuey, Cupertino, both of Calif.

[73] Assignee: Apple Computer, Inc., Cupertino, Calif.

[21] Appl. No.: 511,187

[22] Filed: Aug. 4, 1995

[51] Int. Cl.[6] .......................... H03K 17/16; H03K 19/00
[52] U.S. Cl. ................ 326/30; 326/101; 326/93; 327/292; 327/297
[58] Field of Search .................. 326/30, 93, 101; 327/292, 293, 295, 297

[56] References Cited

U.S. PATENT DOCUMENTS

| | | | |
|---|---|---|---|
| 5,109,168 | 4/1992 | Rusu | 327/297 |
| 5,122,693 | 6/1992 | Honda et al. | 327/297 |
| 5,270,592 | 12/1993 | Takahashi et al. | 326/101 |
| 5,414,832 | 5/1995 | Denneau et al. | 395/550 |
| 5,416,861 | 5/1995 | Koh et al. | 385/14 |

*Primary Examiner*—Edward P. Westin
*Assistant Examiner*—Richard Roseen
*Attorney, Agent, or Firm*—Burns, Doane, Swecker & Mathis, L.L.P.

[57] ABSTRACT

A system in which line reflections in a clock distribution network are cancelled by providing the clock distribution network with a branching point and suitably arranging recipient devices with respect to the branching point to provide for clock pulse reflection cancellation and attenuation. Moreover, the system can be arranged so that clock pulse reflections are not received as pulses which are discrete from legitimate clock pulses. The system also provides capability for reducing electromagnetic interference.

3 Claims, 3 Drawing Sheets

5,583,449

CANCELLATION OF LINE REFLECTIONS IN A CLOCK DISTRIBUTION NETWORK

BACKGROUND

This invention relates to cancellation of line reflections in a clock distribution network, and more particularly, to cancellation of such reflections in such a way that the reflections are not accidentally misinterpreted as events. Conventional clock distribution networks are arranged in a manner known as "daisy-chaining" as shown in FIG. 1. In FIG. 1, a source 10 of a clock signal is applied through a line damping resistor 40 to a network which in the configuration shown, for the sake of simplicity, has two devices, a first device 20 and a second device 30. The system also includes a termination 50 modeled as a resistor 60 and a capacitor 70.

In systems such as that shown in FIG. 1, a clock signal originating from the clock signal source 10 propagates to the first device 20 and then to the second device 30. Upon encountering the second device 30, however, at least part of the energy of the clock pulse will be reflected back toward the first device 20. This can result in a secondary pulse appearing at the clock input of the first device 20, which can cause double clocking within one clock cycle, and which can in turn result in operating errors such as misregistration of data flow.

SUMMARY

The present invention attempts to address the problem of reflections in a clock distribution network in the prior art by providing an arrangement in which reflections will automatically and inherently cancel. Toward this end, in one embodiment of the invention, there is provided a source of clock signals which is coupled to a clock distribution network for distributing the clock signals. A first device is coupled to the clock distribution network to receive the clock signals. A second device is also coupled to the clock distribution network to receive the clock signals. The distribution network includes a branching point. The branching point is electrically substantially equidistant from the first device and the second device and it is electrically substantially closer to the first device than it is to the source of clock signals.

In the present preferred embodiment, the electrical distance between the first device and the branching point is not greater than about 10% of the electrical distance between the first device and the source clock signals.

In an arrangement such as that described, and as will be described below, the clock signals' reflections will inherently tend to cancel. Also, the energy left from the clock signal reflections will tend to arrive at a clocked device in such a manner that it will tend to coalesce with the clock pulse, and so will not be misinterpreted by the receiving device as a separate clocking signal.

DETAILED DESCRIPTION OF PREFERRED EMBODIMENTS

Figure 1:
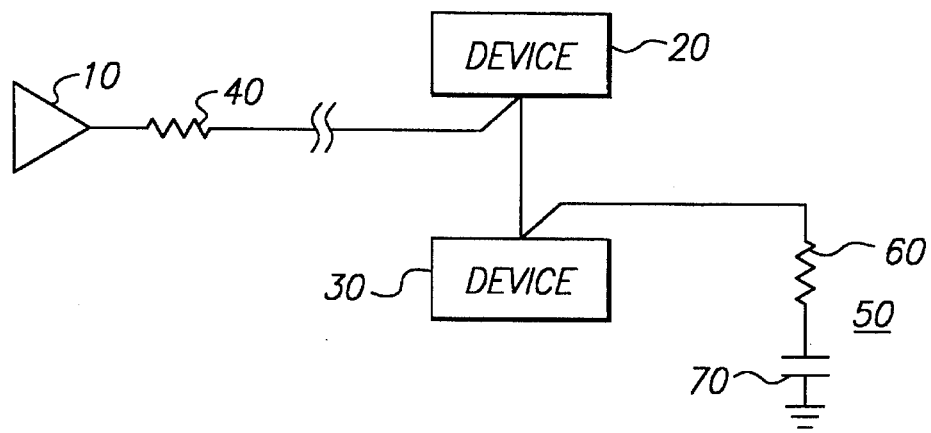
FIG. 1 is a functional block diagram of a conventional system.
Figure 2:
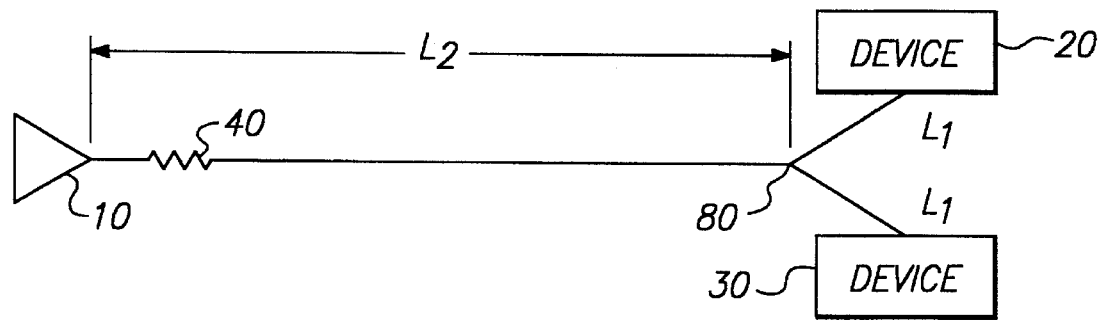
FIG. 2 is a functional block diagram of a system according to the present invention.

A present preferred embodiment of the invention is shown in FIG. 2. FIG. 2, numeral 10 again designates a clock signal source and numeral 40 again indicates a line damping resistor. Also, numeral 20 indicates a first device which will be clocked by the clock signal, and numeral 30 indicates a second device to be clocked by the clock signal.

The clock distribution in the embodiment of FIG. 2, however, also includes a branching point 80. This branching point is positioned to be electrically substantially equidistant from the first device 20 and the second device 30. By "electrically substantially equidistant" is meant that a propagation time of a signal between branching point 80 and the first device 20 is substantially the same as the propagation time of a signal from the branching point 80 to the second device 30. This will in general be a function not only of the linear distance of the circuit path between the devices and the branching point, but also of the impedance of the branches. This distance has been designated in the Figure as $L_1$.

The effect of arranging a clock distribution network as shown in FIG. 2 is that clock pulses branching at point 80 will be received by the first device 20 and the second device 30 at substantially the same time ($t_1$), reflections will be generated at substantially the same time ($t_2$), and those reflections will propagate back to the branching point at substantially the same time ($t_3$). Any reflections will thus tend to cancel. Moreover, a reflected clock pulse propagating backward toward the branching point 80 will in effect encounter an impedance discontinuity caused by the fact that it will "see" the parallel branches of both the path to the other device as well as a path back to the signal source 10. This impedance discontinuity will permit only part of the energy of the reflected wave to propagate back through to the other device.

It has also been determined in accordance with the present invention that it is advantageous to arrange the branching point so that it is electrically substantially closer to the clock devices, first device 20 and second device 30, than it is to the clock signal source 10. Again, the concept of electrical distance here is intended to refer to the amount of time it takes a signal to propagate between two points. It has been determined that it is especially advantageous to have the distance between the branching point and one of the devices, designated $L_1$, to be approximately 10% of the overall distance between the device and the clock source, which will be the sum of $L_2$ and $L_1$ as shown in the drawing.

Figure 3A:
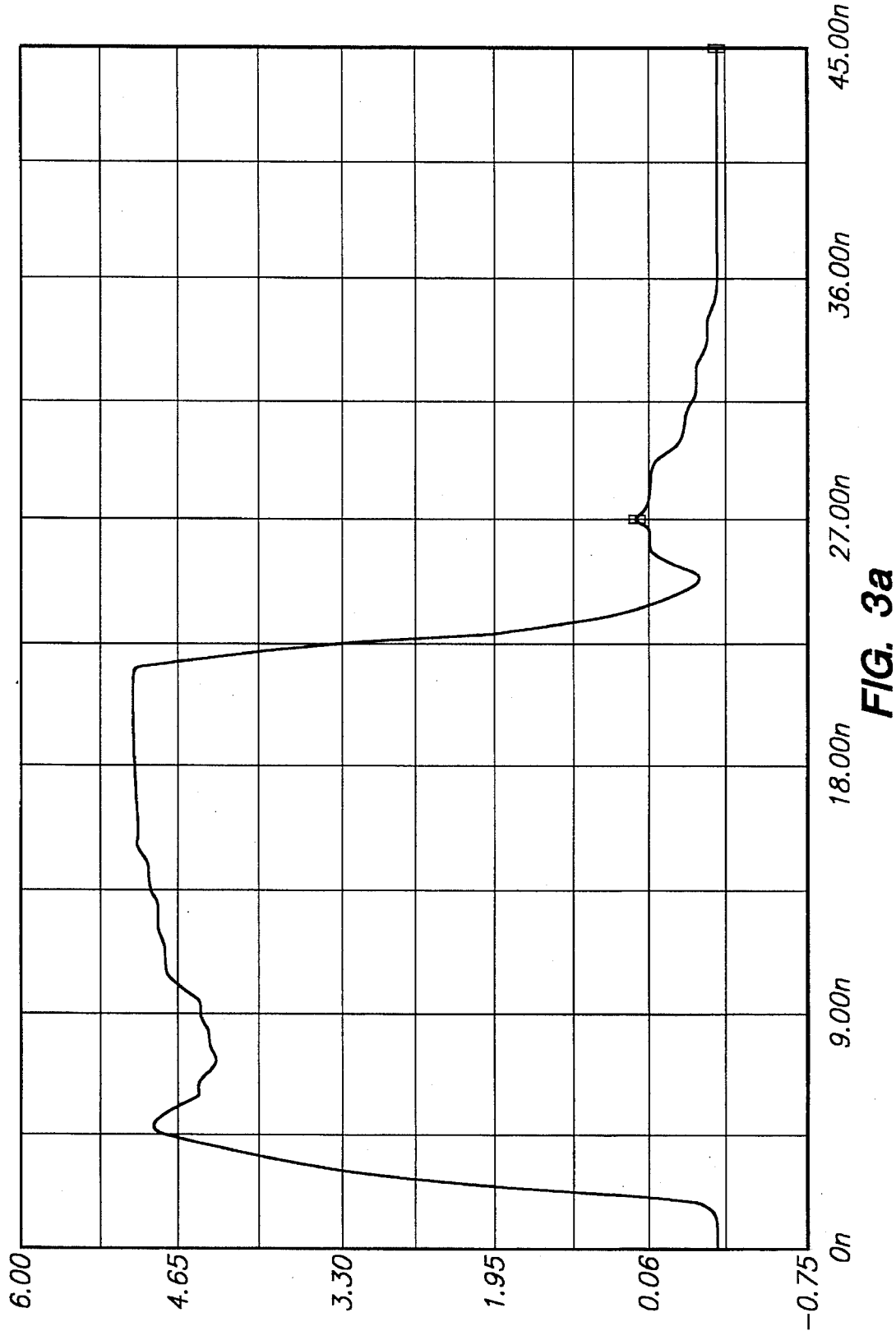
FIGS. 3(a) and 3(b) are waveforms showing propagation of clocking signals in a conventional system and in a system according to the present invention, respectively.
Figure 3B:
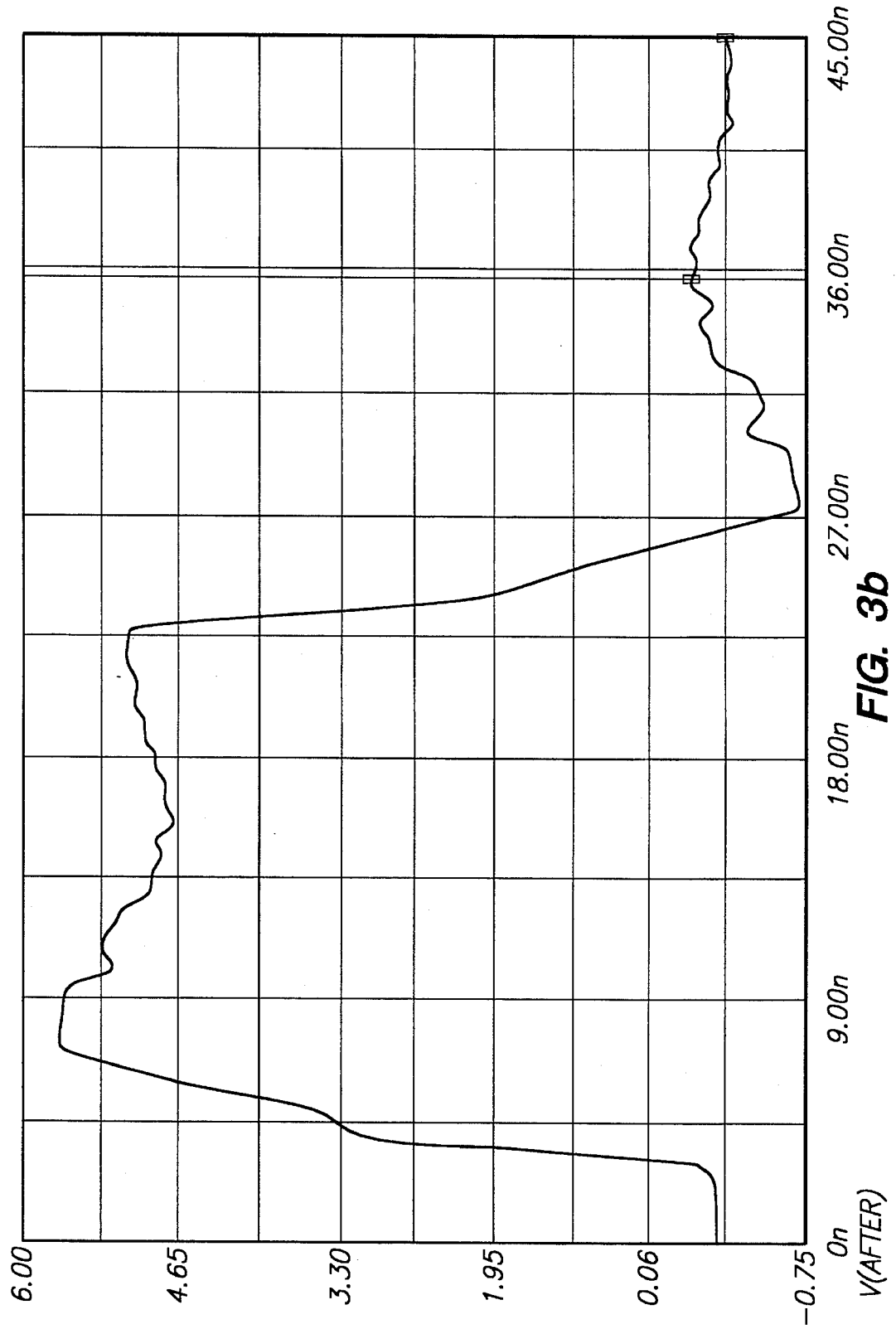

As mentioned, one effect of the arrangement as shown is not simply that the waves are attenuated, but also that the return pulse from the other device tends to arrive at a time at which it is not distinguishable from the original pulse. This situation is shown in FIGS. 3(a) and 3(b). FIG. 3(a) shows a conventional case where a clock pulse is received followed by a subsequent, smaller pulse which is a reflection of the clock pulse from another point in the system. In an arrangement according to the present invention, a characteristic waveform for which is shown in FIG. 3(b), the return wave tends to arrive at a time when it is not distinguishable from the original clock pulse. This decreases the edge rate at the trailing edge but avoids a second positive edge. In a typical clocking device which triggers at the positive edge, merging the reflection with the primary clock reduces the chance of spurious clock events. Also, because the edge rate is decreased, the system has less of a tendency to emit electromagnetic interference. This is because the shallower falling edge of the pulse contains fewer high spectral frequency components. This is an added benefit of an arrangement according to the present invention.

The foregoing invention has been described in terms of the specific embodiments. It will be appreciated by one of ordinary skill in the art, however, that the invention can be embodied differently without departing from its fundamental principles. The invention should therefore not be regarded as being limited to the foregoing embodiments, but should instead be regarded as being fully commensurate in scope with the following claims.

What is claimed is:

1. Apparatus comprising:

a source of clock signals;

a clock distribution network coupled to said source of clock signals for distributing said clock signals;

a first device coupled to said clock distribution network, said first device operating in accordance with said clock signals; and a second device coupled to said clock distribution network, said second device operating in accordance with said clock signals, said distribution network including a branching point, said branching point being electrically substantially equidistant from said first device and said second device, wherein an electrical distance between said first device and said branching point is not greater than about ten percent of an electrical distance between said first device and said source.

2. Apparatus comprising:

a source of clock signals;

a clock distribution network coupled to said source of clock signals for distributing said clock signals;

a first device coupled to said clock distribution network, said first device operating in accordance with said clock signals; and a second device coupled to said clock distribution network, said second device operating in accordance with said clock signals, said distribution network including a branching point, said branching point being electrically substantially equidistant from said first device and said second device, and being electrically substantially closer to said first device than to said source of clock signals wherein said first and second devices are positive edge devices.

3. Apparatus comprising:

a source of clock signals;

a clock distribution network coupled to said source of clock signals for distributing said clock signals;

a first positive edge device coupled to said clock distribution network, said first device operating in accordance with said clock signals;

a second positive edge device coupled to said clock distribution network, said second device operating in accordance with said clock signals;

said distribution network including a branching point, said branching point being an electrical distance "L" from said first positive edge device and said second positive device, with "L" being not greater than approximately ten percent of the electrical distance between said source and said first positive edge device.

* * * * *